US008291012B2

(12) United States Patent
Gupta et al.

(10) Patent No.: US 8,291,012 B2
(45) Date of Patent: Oct. 16, 2012

(54) ADDRESS UPDATING SCHEME FOR WIRELESS COMMUNICATION

(75) Inventors: Rajarshi Gupta, Santa Clara, CA (US); Ramachandran Subramanian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 265 days.

(21) Appl. No.: 12/491,128

(22) Filed: Jun. 24, 2009

(65) Prior Publication Data

US 2010/0106772 A1 Apr. 29, 2010

Related U.S. Application Data

(60) Provisional application No. 61/080,183, filed on Jul. 11, 2008.

(51) Int. Cl.
*G06F 15/16* (2006.01)
*H04W 4/00* (2009.01)
*H04M 1/00* (2006.01)

(52) U.S. Cl. ...... 709/203; 709/227; 370/331; 455/562.1

(58) Field of Classification Search .................. None
See application file for complete search history.

(56) References Cited

U.S. PATENT DOCUMENTS

| | | | | |
|---|---|---|---|---|
| 7,391,754 B2* | 6/2008 | Bae et al. | ...... | 370/331 |
| 7,400,897 B2* | 7/2008 | Lazaridis | ...... | 455/507 |
| 7,509,428 B2* | 3/2009 | McKeeth | ...... | 709/227 |
| 2005/0228723 A1* | 10/2005 | Malik | ...... | 705/26 |
| 2008/0248830 A1* | 10/2008 | Lazaridis | ...... | 455/552.1 |

OTHER PUBLICATIONS

Che-Hua Yeh et al: "SIP Terminal Mobility for both IPv4 and IPv6" Distributed Computing Systems Workshops, 2006. ICDCS Workshops 2006. 2 6TH IEEE International Conference on LISB0A, Portugal Jul. 4-7, 2006, Piscataway, NJ, USA,IEEE, Jul. 4, 2006, pp. 53-53, XP010927196 ISBN: 978-0-7695-2541-9 * Section 1-Section 3 *.
Deguang Le et al: "A review of mobility support paradigms for the internet" IEEE Communications Surveys, IEEE, New York, NY, US, vol. 8. No. 1, Jan. 1, 2006, pp. 38-51, XP011172172 ISSN: 1553-877X p. 46, col. 2, line 35-p. 47, col. 2, line 19.
International Search Report & Written Opinion—PCT/US2009/050165, International Search Authority—European Patent Office—Nov. 19, 2009.
Niccolini NEC S Salsano Univ of Rome Tor Vergata H Izumikawa KDDI Labs R Lillie Motorola Labs L Veltri Univ of Parma Y Kishi KDDI: Requirements for vertical handover of muitimedia sessions using SIP; draft-niccolini-sipping-siphandover-04.txt n Requirements for Vertical Handover of multimedia Sessions using SIP; Draft-Niccolini-Sipping-Siphandover-04.txt , Internet Engineering Task Force, IETF; Standardworkingdraft, Internet Society (ISOC) 4, Rue Des Falaises CH-1205 Geneva, Switzerland, No. 4, Jul. 8, 2008, XP015059632 the whole document.
Rosenberg J et al. RFAC 3261: "SIP: Session Initiation Protocol" 20020601; 20020600, Jun. 1, 2002, pp. 1-270, XP015009039.

(Continued)

*Primary Examiner* — Wen-Tai Lin
(74) *Attorney, Agent, or Firm* — Florin Corie; Kam T. Tam

(57) ABSTRACT

In an address updating scheme, a server accesses clients with intermittent connectivity by using addresses specified in a local client address list. The clients are responsible for updating the list whenever the address of the client changes as a result of intermittent client connectivity or other conditions.

38 Claims, 8 Drawing Sheets

OTHER PUBLICATIONS

Salsano Univ of Rome Tor Vergata S Niccolini Nec L Veltri Univ of Parma a Polidoro Univ of Rome Tor Vergata S: "A solution for vertical handover of multimedia sessions using SIP; draft-salsano-sipping-siphandover-solution-02.txt" IETF Standard-Working-Draft, Internet Engineering Task Force, IETF, CH, No. 2, May 7, 2008, XP015056936 ISSN: 0000-0004 1-40 ***** Section Section Section Section Section Section 1 2 3 3 4 4 7* 1-* 1 **.

Schulzrinne H. and Wedlund E.: "Application-Layer Mobility Using SIP" ACM SIGMOBILE Mobile Computing and Communications Review, vol. 4, No. 3, Jul. 2000, pp. 47-57, XP040124318 ACM, 2 Penn Plaza, Suite 701—New York USA Section II Section III.B.I.

Johnson, D., et al., "Mobility Support in IPV6," The Internet Society, Jun. 2004.

* cited by examiner

ADDRESS UPDATING SCHEME FOR WIRELESS COMMUNICATION

CLAIM OF PRIORITY UNDER 35 U.S.C. §119

This application claims the benefit of and priority to commonly owned U.S. Provisional Patent Application No. 61/080,183, filed Jul. 11, 2008, the disclosure of which is hereby incorporated by reference herein.

BACKGROUND

1. Field

This application relates generally to wireless communication and more specifically, but not exclusively, to an address updating scheme.

2. Introduction

A variety of techniques have been developed to enable a node in a network to establish communication with other node in the network. For example, an access terminal (e.g., a cell phone) in a cellular system will typically be set to idle mode when a call is not active to conserve battery power. When information needs to be sent to an access terminal, multiple access points in the system may page the access terminal in those areas that are near the location where the access terminal last communicated with an access point. Upon receiving such a page (e.g., by waking up at designated times), the access terminal may connect to a nearby access point to enable the information to be received at the access terminal.

In a data network, a network device may discover the Internet Protocol ("IP") address of another network device on the network through the use of a domain name system ("DNS"). Here, DNS servers keep track of the domain names and the IP addresses assigned to devices in the network. Thus, a device that needs to access another device in the network may acquire the IP address of that device from a DNS server by providing the fully qualified domain name ("FQDN") to the DNS server.

Connectivity issues in wireless applications may not be adequately addressed by the above techniques. For example, a mobile access terminal may have intermittent connectivity and, as a result, its IP address may change frequently. Furthermore, capabilities such as DNS may not be available in a mobile environment. Hence, there is a need for effective techniques for establishing connectivity in wireless networks.

SUMMARY

A summary of sample aspects of the disclosure follows. It should be understood that any reference to the term aspects herein may refer to one or more aspects of the disclosure.

The disclosure relates in some aspects to a scheme where a server maintains a list that specifies an address of one or more clients and where each client is responsible for updating the list in the event the address of that client changes. For example, in a client-server communication model where a client has intermittent connectivity with a network, the address of the client may change every time the client reconnects. Such intermittent connectivity may be relatively common in cases where the client resides on a cell phone and the server resides on the network. In such a case, the server may use the client address list to obtain the current address of any of its clients in the event the server needs to contact these clients.

In some aspects a registration object is hosted at a server, whereby the server may contact a client by using an IP address specified by the object for that client. Here, the client has the responsibility to keep this object up-to-date. Thus, every time the IP address of the client changes, the client informs the server of the change. Since the address of the server is relatively stable (or reachable through DNS), the client is able to connect to the server when it has IP connectivity.

BRIEF DESCRIPTION OF THE DRAWINGS

These and other sample aspects of the disclosure will be described in the detailed description and the appended claims that follow, and in the accompanying drawings, wherein:

Figure 1:
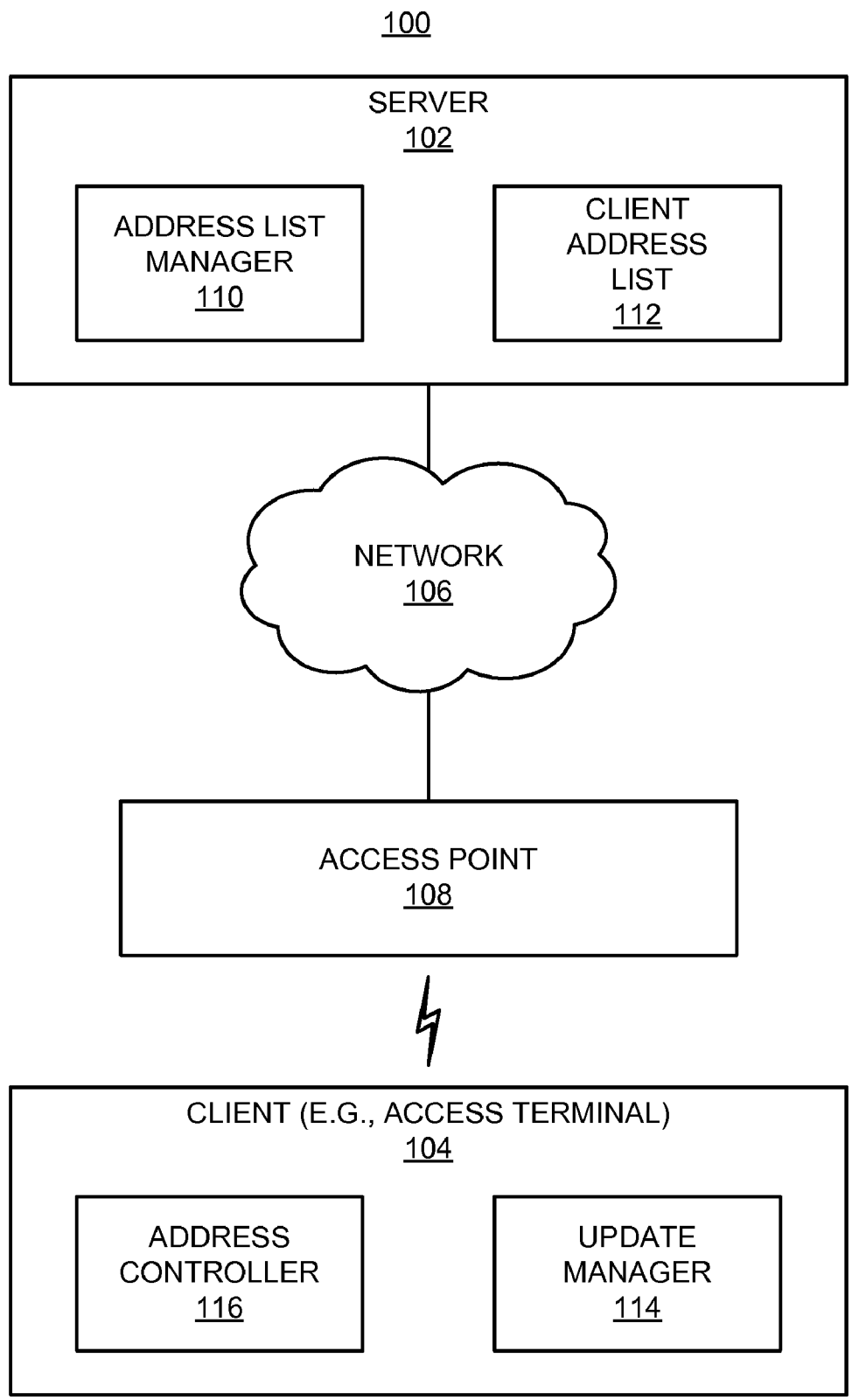
FIG. 1 is a simplified block diagram of several sample aspects of a communication system where clients update client address lists maintained by servers.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more clients (e.g., access terminals) and servers that communicate with one another. It should be appreciated that the teachings herein may be applicable to other types of apparatuses or other similar apparatuses that are referenced using other terminology. For example, a client or a server as described herein may comprise a client device or a server device, respectively, or may be implemented within another device. Also, in various implementations access terminals may be referred to or implemented as user equipment, mobiles, cell phones, and so on.

The system includes one or more servers (represented, for convenience, by a server 102) that provide one more services for one or more clients (represented, for convenience, by a client 104). Such services may include for example, network access, webpage access, database access, printing services, and so on.

The example of FIG. 1 illustrates an implementation where the client 104 communicates with the server 102 via a network 106. The network 106 may comprise, for example, a wide area network such as a cellular network. Access points (represented, for convenience, by an access point 108) associated with the network 106 provide network connectivity for any wireless access terminals that may be installed within or that may roam throughout an area served by the access points. The access points, in turn, communicate with one or more network nodes (e.g., core network nodes, not shown) to enable connectivity to other devices connected to the network 106.

The client 104 may have intermittent network connectivity. For example, a client 104 that is a mobile device may frequently switch to idle mode (e.g., to conserve battery power), may frequently move out of a coverage area, may be disconnected from the network whenever it is powered-down, and so on. Consequently, the client 104 may be assigned a new address (e.g., IP address) by the network whenever the client 104 returns to an active mode, moves back into a coverage area, re-connects with the network, etc.

In accordance with the teachings here, the server 102 (e.g., an address list manager 110) maintains a client address list 112 to enable the server 102 to effectively communicate with the client 104 in cases where the client 104 has intermittent connectivity. In some aspects the client address list 112 may include a mapping between each client served by the server 102 and one or more addresses (e.g., IP address) assigned to each client.

The client address list 112 is updated whenever an address assigned to one of these clients is changed (e.g., due to re-connection). To this end, the client 104 includes an update manager 114 that determines whether a new address has been assigned to the client 104(e.g., by operation of an address controller 116) and sends a message to the server 102 to update the client address list 112 in the event a new address has been assigned.

Sample operations of the system 100 will now be described in more detail in conjunction with the flowchart of FIGS. 2A and 2B. For convenience, the operations of FIGS. 2A and 2B (or any other operations discussed or taught herein) may be described as being performed by specific components (e.g., components of the system 100 and/or depicted in FIG. 5). It should be appreciated, however, that these operations may be performed by other types of components and may be performed using a different number of components. It also should be appreciated that one or more of the operations described herein may not be employed in a given implementation.

Figure 2A:
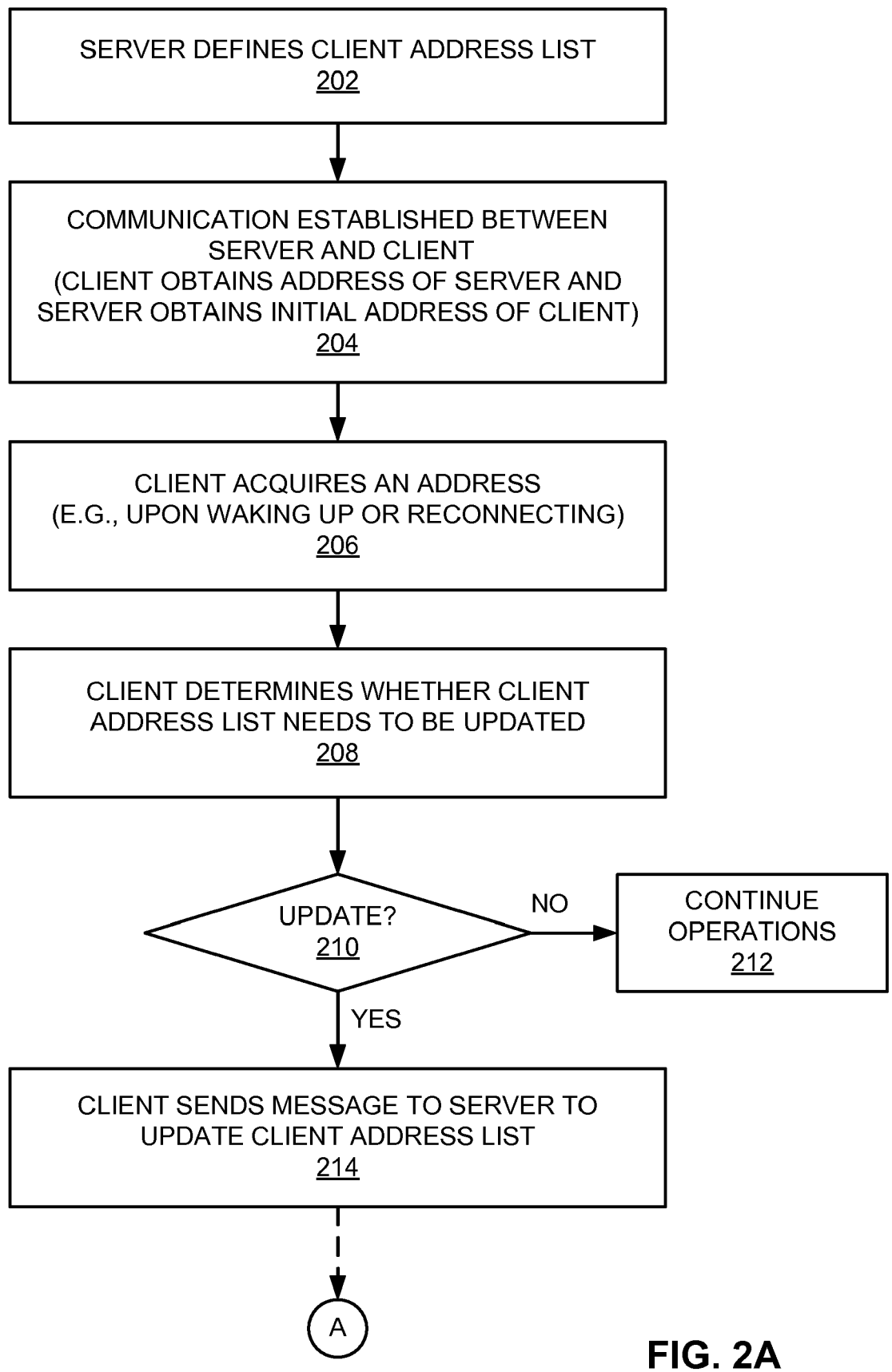
FIGS. 2A and 2B are a flowchart of several sample aspects of operations that may be performed in conjunction with updating a client address list maintained by a server.

As represented by block 202 of FIG. 2A, the server 102 (e.g., the address list manager 110) defines the client address list 112. The client address list 112 may take various forms. In some implementations the client address list 112 comprises a registration object that is hosted at the server 102. For example, the client address list 112 may be a management object entitled "IP Registration" in a management server.

As mentioned above, the client address list 112 may include entries for every client with which the server 102 communicates (e.g., for every client served by the server 102). A given entry may include an identifier of the client and one or more addresses associated with (e.g., assigned to) the client. Here, the identifier may be unique to that client at least from the perspective of the server 102 (e.g., the identifier may be, but need not be, globally unique).

As represented by block 204, at some point in time communication is established between the server 102 and a given client 104. For instance, the client 104 may initiate communication with the server 102. In conjunction with establishing communication, the server 102 and the client 104 exchange addresses (e.g., IP addresses) to enable each device to send messages to the other device.

Thus, the server 102 may obtain one or more initial addresses of the client 104 that the server 102 may use to communicate with the client 104. Upon receipt of such an address, the server 102 (e.g., the address list manager 110) creates an entry in the client address list 112 for the client 104 and stores the received address with that entry. In some cases, a client may be accessed via any one of several addresses (e.g., when a user has several devices installed in his or her home). In such cases, the client address list 112 may specify multiple addresses for one client.

At block 204 the client 104 also may obtain an address (e.g., an IP address) of the server 102 that the client may use to communicate with the server 102. In a typical implementation, client-initiated communication may be relatively easy to guarantee since the address of the server 102 may rarely change (if at all). Accordingly, the server 102 will typically be reachable by the client 104 at all times. Alternatively, the address of the server will be available through querying a DNS server with the server's FQDN. Thus, in accordance with the teachings herein, the burden of keeping the client address list 112 (e.g., the registration object) up to date is placed on the client 104.

As represented by block 206, at some point in time the client 104 (e.g., the address controller 116) may acquire a different address that the server 102 may use to communicate with the client 104. The client 104 may acquire this address under various circumstances and in various ways. For example, in some cases the client may acquire an address upon waking up from idle mode or re-connecting with the access point 108. In these cases, the client 104 may communicate with the access point 108 to establish a physical layer connection and a MAC layer connection. The network 106 (e.g., a packet gateway in the network 106) may then assign an IP address to the client 104.

As represented by block 208, the client 104 (e.g., the update manager 114) then determines whether the client address list 112 needs to be updated. For example, the client 104 may determine whether the address acquired at block 206 is different than the address the client 104 has been using. In addition, the client 104 may determine whether the address acquired at block 206 is already stored in the client address list 112. In some implementations, the client 104 may determine that it needs to update the list based simply on the acquisition of an address (e.g., the client 104 does not check to see whether this address is new or whether it is already in the client address list 112).

In some cases the client 104 may be in communication with more than one server (e.g., the client 104 may be accessing different services provided by different servers). In these cases, at block 208 the client may determine whether the client address list 112 maintained at one or more of these servers needs to be updated.

As represented by blocks 210 and 212, in the event there is no need to update the client address list 112, the client-server interactions may continue operating as they were previously. That is, the server 102 will continue to use the address for the client 104 that was previously in the client address list 112.

Figure 5:
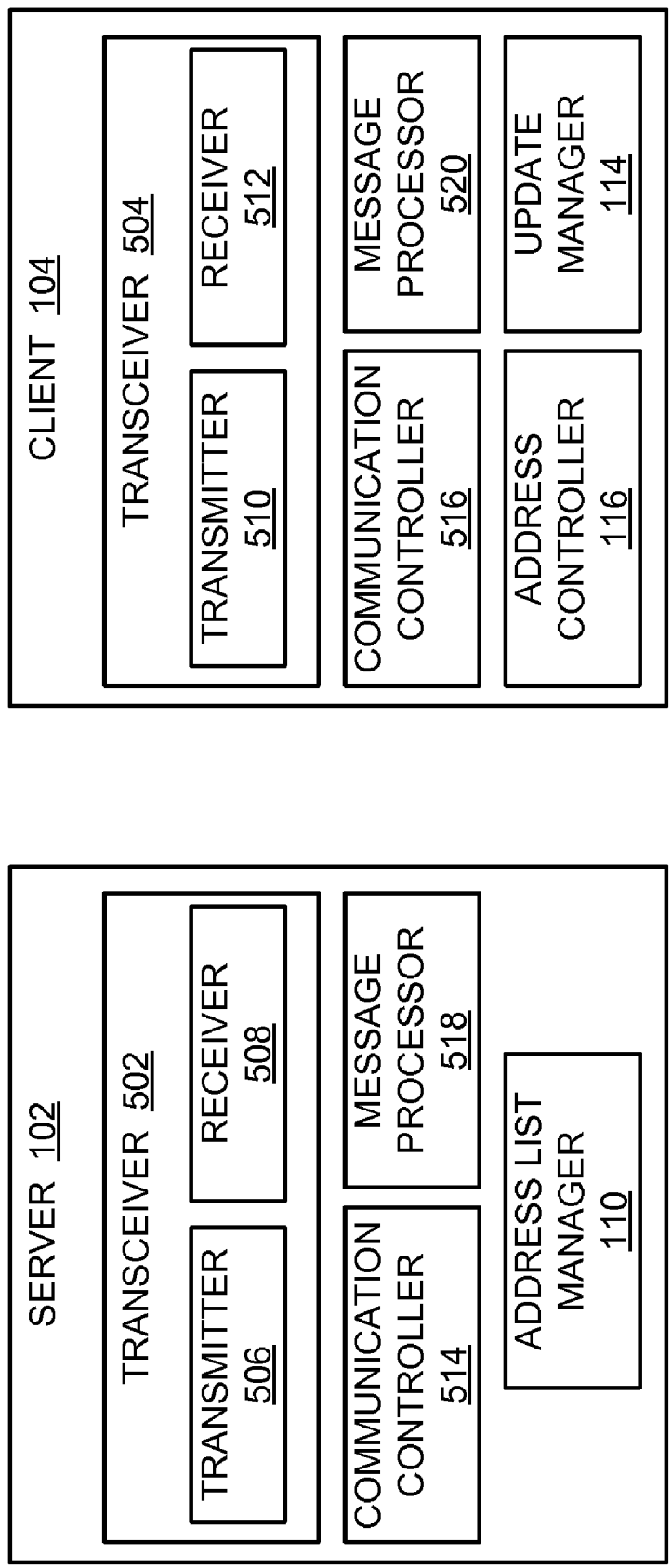
FIG. 5 is a simplified block diagram of several sample aspects of components that may be employed in communication nodes.

As represented by block 214, if the client address list 112 needs to be updated, the client 104 (e.g., a message processor 520 as shown in FIG. 5) sends a message to the server 102 to update the client list 112. This message may thus include an indication of the address.

Figure 2B:
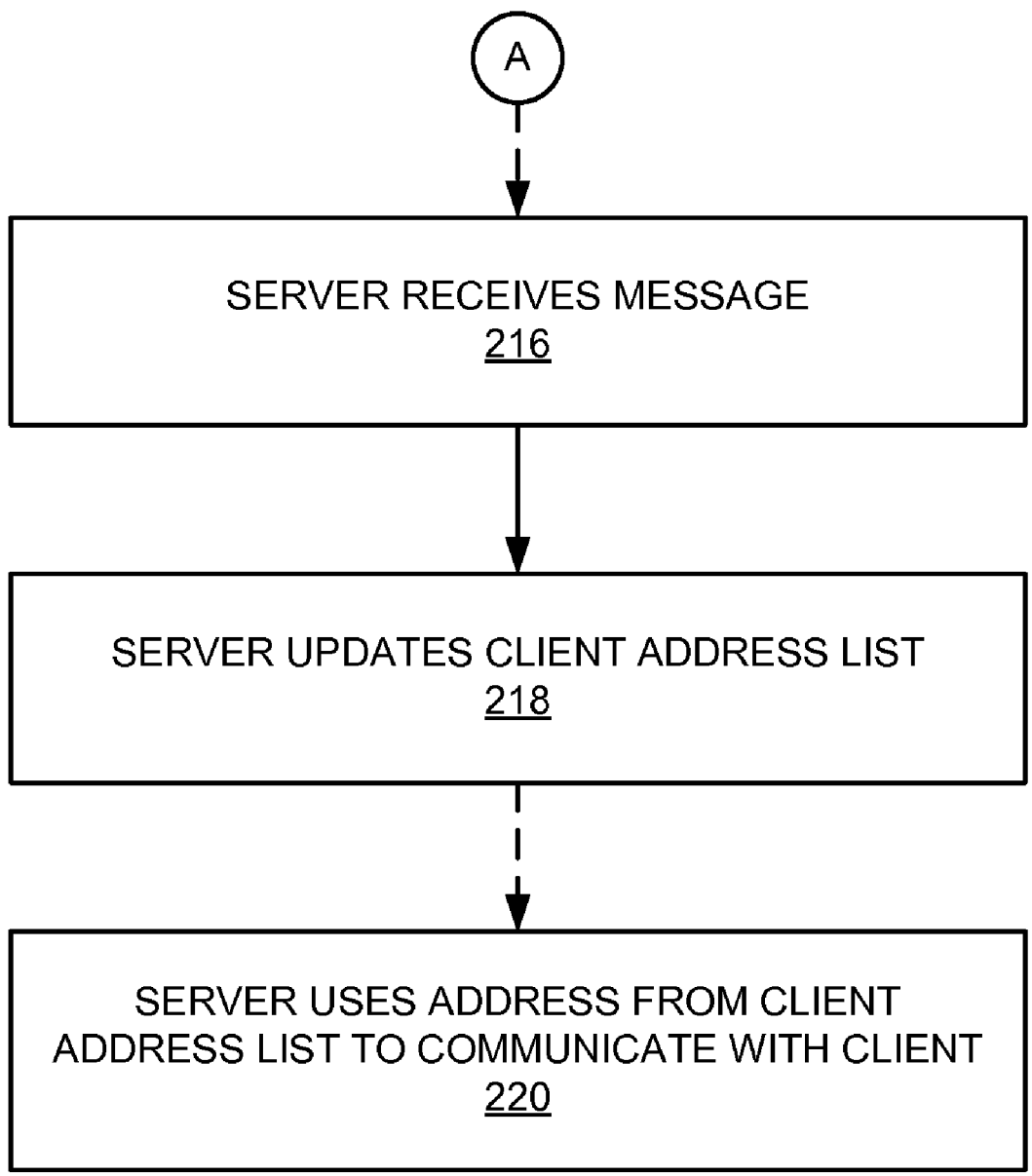

The server 102 (e.g., a message processor 518 as shown in FIG. 5) receives this message as represented by block 216 of FIG. 2B. As represented by block 218, upon receiving this message, the server 102 (e.g., the address list manager 110) updates the client address list 112 with the address send by the client 104.

As represented by block 220, at some point in time the server 102 will need to initiate communication with the client 104. Accordingly, the server 102 (e.g. a communication controller 514 as shown in FIG. 5) obtains the current address for the client 104 from the client address list 112 and uses this address to communicate with the client 104.

Figure 3:
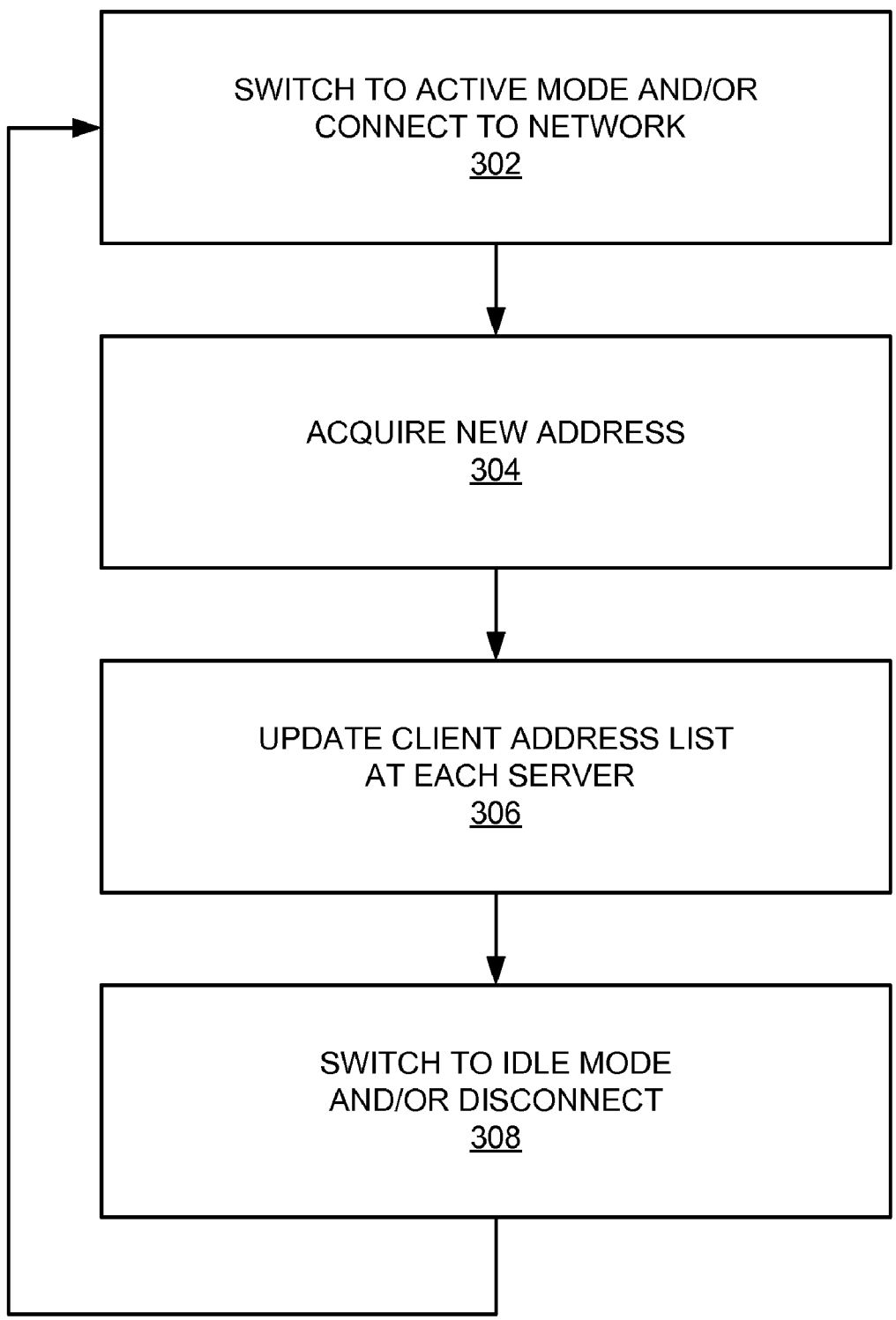
FIG. 3 is a flowchart of several sample aspects of operations that may be performed at a client that has intermittent connectivity.

As mentioned above, a mobile client will have intermittent connectivity due to, for example, transitions to idle mode, loss of signal, moving out of range of an access point, being turned off, and so on. Consequently, such a client will repeatedly update the client address list at each of the servers with which it is communicating. FIG. 3 describes sample operations for this procedure.

As represented by block 302, at some point in time the client 104 will switch to active mode, connect to a network, or perform some other operation that causes a new address to be assigned to the client 104. The client 104 then acquires the new address at block 304. At block 306 the client 104 updates the client address list at each of its servers, if applicable.

As represented by block 308, at some point in time the client 104 will switch to idle mode, disconnect from a network, or perform some other operation that causes the address assigned to the client to be unassigned. Here, it may be more efficient from a system performance point of view to reallocate addresses when they are not being used.

Accordingly, when the client 104 switches back to active mode or reconnects to the network (back to block 302), another address is assigned to the client. Thus, the operations of FIG. 3 may be performed on a repeated basis to maintain an up-to-date client address list 112 at the server 102.

Figure 4:
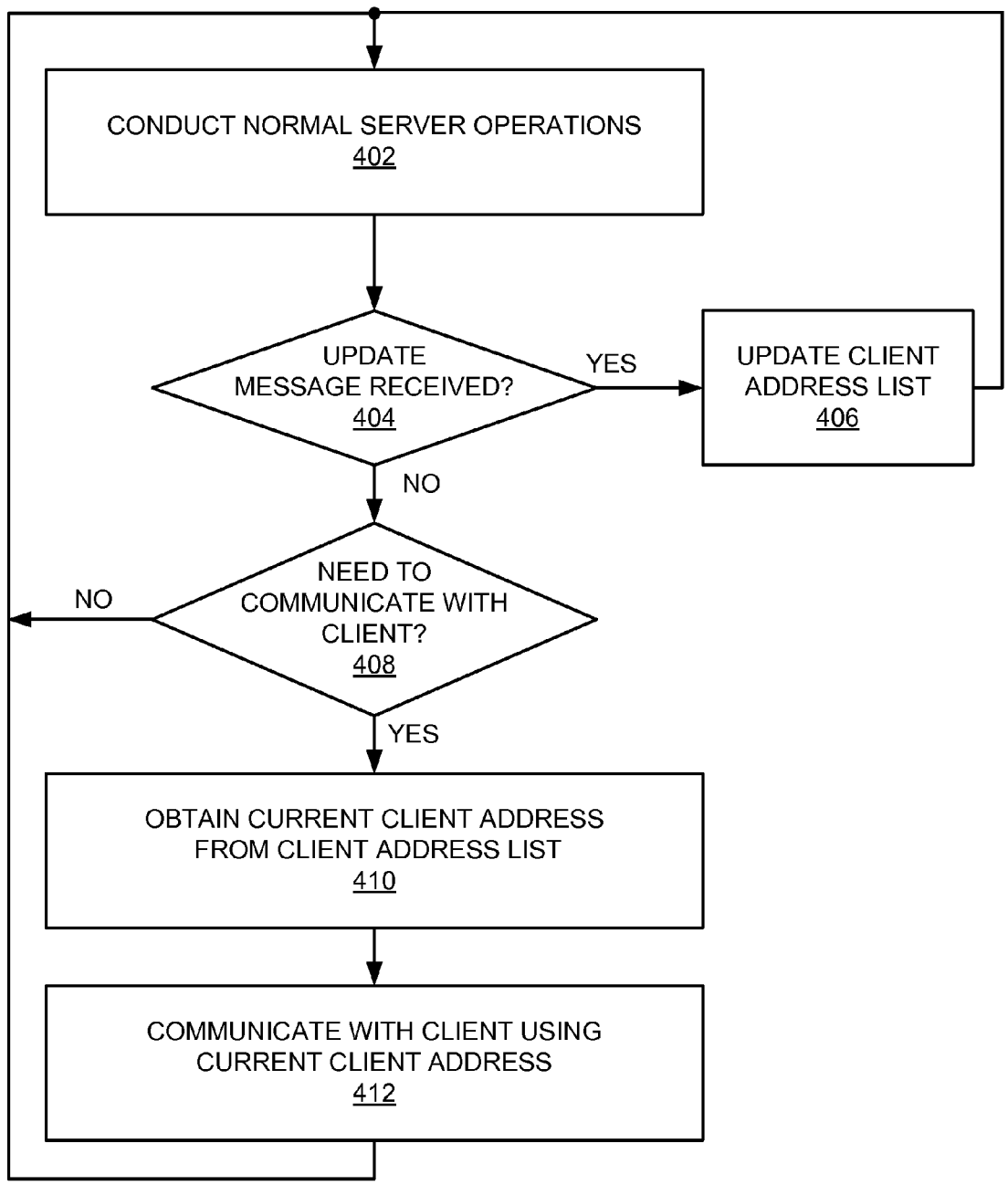
FIG. 4 is a flowchart of several sample aspects of operations that may be performed at a server that serves one or more clients that have intermittent connectivity.

From the above, it may be seen that each server may repeatedly receive address list update messages from any clients with which that server is communicating. Thus, each server may repeatedly update its client address list so that when a server needs to communicate with a given client, the server can use the client address list to obtain a current address. FIG. 4 describes sample operations for these procedures.

As represented by block 402, the server 102 conducts normal operations (e.g., operations that don't involve a particular client) until an event occurs that causes the server 102 to take some action relating to that client. In the example of FIG. 2, these events may include receiving an update message from the client (as represented by block 404) and/or needing to communicate with the client (as represented by block 408).

As represented by blocks 404 and 406, in the event the server 102 receives a client address list update message from one of its clients, the server 102 will update the client address list 112. As mentioned above, the client address list 112 may include entries for different clients. Thus, at some other time, the server 102 may receive a client address list update message from another one of its clients and the server 102 will update the corresponding entry in the client address list 112. Hence, the operations of blocks 404 and 406 may be performed on a repeated basis any time a client address list update message is received.

As represented by block 408, the server 102 (e.g., the communication controller 514) may need to communicate with a given client from time to time. Accordingly, as represented by block 410, to initiate this communication, the server 102 may obtain the current address of that client from the client address list 112. The client may then use that address to communicate with the client as represented by block 412. As mentioned above, the client address list 112 may include entries for different clients. Consequently, at some other time, the server 102 may initiate communication with another client by obtaining an address for that client from the corresponding entry in the client address list 112. The operations of blocks 408-412 may thus be performed on a repeated basis any time the server 102 needs to communicate with one of its clients.

FIG. 5 illustrates several sample components that may be incorporated into apparatuses such as the server 102 and the client 104 to perform address update operations as taught herein. As mentioned above, a server apparatus may comprise a server device (e.g., a server computer connected to a network) or may be implemented in a server device (e.g., as a server integrated circuit or a server section of an integrated circuit). Similarly, a client apparatus may comprise a client device (e.g., a cell phone connected to a network) or may be implemented in a client device (e.g., as a server integrated circuit or a server section of an integrated circuit).

The components shown in FIG. 5 also may be incorporated into other nodes (e.g., apparatuses) in a communication system. For example, other nodes in a system may include components similar to those described for the server 102 and the client 104 to provide similar functionality. A given node may contain one or more of the described components. For example, a client may contain multiple transceiver components that enable the client to operate on multiple frequencies and/or communicate via different technologies.

As shown in FIG. 5, the server 102 and the client 104 may include transceivers 502 and 504, respectively, for communicating with other nodes. The transceiver 502 includes a transmitter 506 for sending signals (e.g., communication messages) and a receiver 508 for receiving signals (e.g., list update messages). Similarly, the transceiver 504 includes a transmitter 510 for sending signals (e.g., list update messages) and a receiver 512 for receiving signals (e.g., communication messages). Depending on the connectivity of the nodes of FIG. 5, the transceivers 502 and/or the transceiver 504 may support different communication technologies (e.g., wired or wireless).

The server 102 and the client 104 also include other components that may be used in conjunction with address update operations as taught herein. For example, the server 102 and the client 104 may include communication controllers 514 and 516, respectively, for managing communication with other nodes (e.g., sending and receiving information) and for providing other related functionality as taught herein. In addition, the server 102 and the client 104 may include message processors 518 and 520, respectively, for processing (e.g., sending and receiving) messages and for providing other related functionality as taught herein.

In some aspects the teachings herein may be employed in a wireless multiple-access communication system that simultaneously supports communication for multiple wireless access terminals (e.g., clients). Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
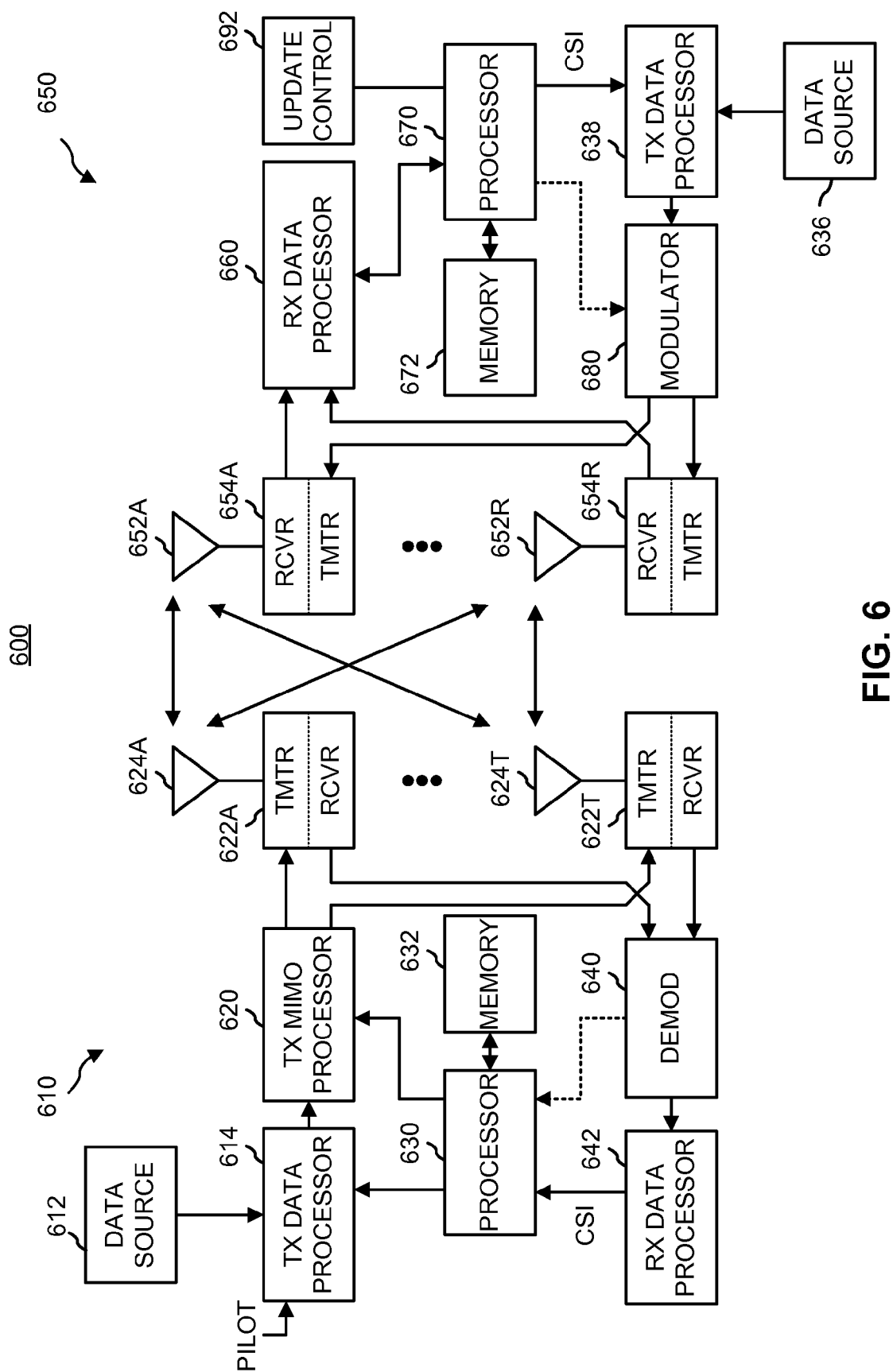
FIG. 6 is a simplified block diagram of several sample aspects of communication components.

The teachings herein may be incorporated into a node (e.g., a device) employing various components for communicating with at least one other node. FIG. 6 depicts several sample components that may be employed to facilitate communication between nodes. Specifically, FIG. 6 illustrates a wireless device 610 (e.g., an access point) and a wireless device 650 (e.g., an access terminal) of a MIMO system 600. At the device 610, traffic data for a number of data streams is provided from a data source 612 to a transmit ("TX") data processor 614.

In some aspects, each data stream is transmitted over a respective transmit antenna. The TX data processor 614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers ("XCVR") 622A through 622T. In some aspects, the TX MIMO processor 620 applies beam-forming weights to the symbols of the data streams and to the antenna from which the symbol is being transmitted.

Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622A through 622T are then transmitted from $N_T$ antennas 624A through 624T, respectively.

At the device 650, the transmitted modulated signals are received by $N_R$ antennas 652A through 652R and the received signal from each antenna 652 is provided to a respective transceiver ("XCVR") 654A through 654R. Each transceiver 654 conditions (e.g., filters, amplifies, and downconverts) a respective received signal, digitizes the conditioned signal to provide samples, and further processes the samples to provide a corresponding "received" symbol stream.

A receive ("RX") data processor 660 then receives and processes the NR received symbol streams from $N_R$ transceivers 654 based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

A processor 670 periodically determines which pre-coding matrix to use (discussed below). The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654A through 654R, and transmitted back to the device 610.

At the device 610, the modulated signals from the device 650 are received by the antennas 624, conditioned by the transceivers 622, demodulated by a demodulator ("DEMOD") 640, and processed by a RX data processor 642 to extract the reverse link message transmitted by the device 650. The processor 630 then determines which pre-coding matrix to use for determining the beam-forming weights then processes the extracted message.

FIG. 6 also illustrates that the communication components may include one or more components that perform update control operations as taught herein. For example, an update control component 692 may cooperate with the processor 670 and/or other components of the device 650 to send/receive update information to/from another device (e.g., via device 610). It should be appreciated that for each device 610 and 650 the functionality of two or more of the described components may be provided by a single component. For example, a single processing component may provide the functionality of the update control component 692 and the processor 670.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies.

In some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal ("AT") moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage (e.g., coverage within a commercial building) over an area that is smaller than a macro area and larger than a femto area. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), a macro cell, a macro node, a Home eNB ("HeNB"), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 7:
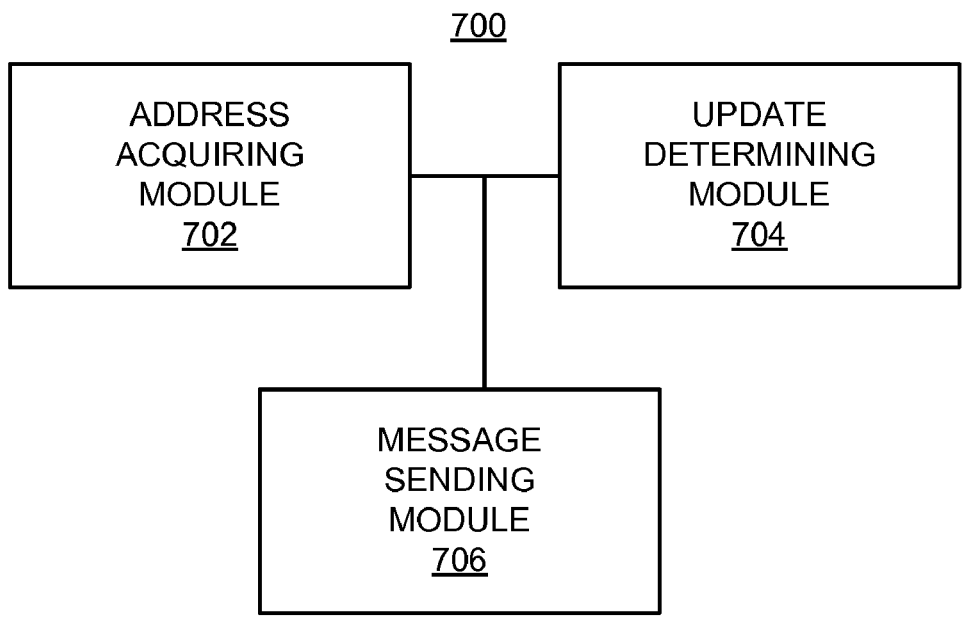
FIGS. 7 and 8 are simplified block diagrams of several sample aspects of apparatuses configured to provide address updates as taught herein.
Figure 8:
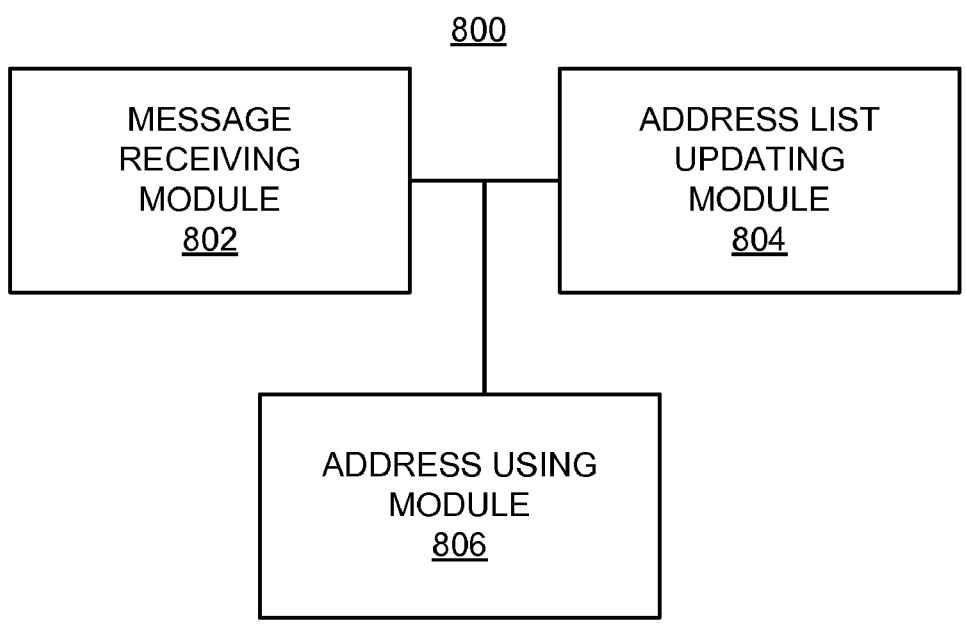

The functionality described herein (e.g., with regard to one or more of the accompanying figures) may correspond in some aspects to similarly designated "means for" functionality in the appended claims. Referring to FIGS. 7 and 8, apparatuses 700 and 800 are represented as a series of interrelated functional modules. Here, an address acquiring module 702 may correspond at least in some aspects to, for example, an address controller as discussed herein. An update determining module 704 may correspond at least in some aspects to, for example, an update manager as discussed herein. A message sending module 706 may correspond at least in some aspects to, for example, a message processor as discussed herein. A message receiving module 802 may correspond at least in some aspects to, for example, a message processor as discussed herein. An address list updating module 804 may correspond at least in some aspects to, for example, an address list manager as discussed herein. An address using module 806 may correspond at least in some aspects to, for example, a communication controller as discussed herein.

The functionality of the modules of FIGS. 7 and 8 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication operable by a client apparatus, comprising:
   acquiring an internet protocol address to be used by a server apparatus to communicate with the client apparatus;
   determining whether a client address list maintained by the server apparatus needs to be updated with the internet protocol address, wherein the client address list maintains an assignment of a plurality of internet protocol addresses to the client apparatus, and wherein determining comprises determining if the internet protocol address is associated with client apparatus on the client address list; and
   sending, as a result of the determination, a message comprising the internet protocol address to the server apparatus via a wireless link to update the client address list.

2. The method of claim 1, wherein:
   the client apparatus has intermittent connectivity with a network such that the client apparatus repeatedly acquires new addresses assigned by the network; and
   the client apparatus repeatedly sends messages to the server apparatus to update the client address list with the new addresses.

3. The method of claim 1, wherein the determination is made as a result of a reconnection of the client apparatus to a network.

4. The method of claim 1, wherein the client address list comprises a registration object hosted at the server apparatus.

5. The method of claim 1, wherein the client apparatus comprises a cell phone.

6. A client apparatus, comprising:
   an address controller configured to acquire an internet protocol address to be used by a server apparatus to communicate with the client apparatus; and
   an update manager configured to determine whether a client address list maintained by the server apparatus needs to be updated with the internet protocol address, wherein the client address list maintains an assignment of a plurality of internet protocol addresses to the client apparatus, and wherein determining comprises determining if the internet protocol address is associated with client apparatus on the client address list; and
   a message processor configured to send, as a result of the determination, a message comprising the internet protocol address to the server apparatus via a wireless link to update the client address list.

7. The client apparatus of claim 6, wherein:
   the client apparatus has intermittent connectivity with a network such that the address controller is further configured to repeatedly acquire new addresses assigned by the network; and
   the message processor is further configured to repeatedly send messages to the server apparatus to update the client address list with the new addresses.

8. The client apparatus of claim 6, wherein the determination is made as a result of a reconnection of the client apparatus to a network.

9. The client apparatus of claim 6, wherein the client address list comprises a registration object hosted at the server apparatus.

10. A client apparatus, comprising:
    means for acquiring an internet protocol address to be used by a server apparatus to communicate with the client apparatus;
    means for determining whether a client address list maintained by the server apparatus needs to be updated with the internet protocol address, wherein the client address list maintains an assignment of a plurality of internet protocol addresses to the client apparatus, and wherein determining comprises determining if the internet protocol address is associated with client apparatus on the client address list; and
    means for sending, as a result of the determination, a message comprising the internet protocol address to the server apparatus via a wireless link to update the client address list.

11. The client apparatus of claim 10, wherein:
    the client apparatus has intermittent connectivity with a network such that the means for acquiring is configured to repeatedly acquire new addresses assigned by the network; and
    the means for sending is configured to repeatedly send messages to the server apparatus to update the client address list with the new addresses.

12. The client apparatus of claim 10, wherein the determination is made as a result of a reconnection of the client apparatus to a network.

13. The client apparatus of claim 10, wherein the client address list comprises a registration object hosted at the server apparatus.

14. A computer-program product, comprising:
    non-transitory computer-readable medium comprising code for causing a computer to:
    acquire, at a client apparatus, an internet protocol address to be used by a server apparatus to communicate with the client apparatus;
    determine whether a client address list maintained by the server apparatus needs to be updated with the internet protocol address, wherein the client address list maintains an assignment of a plurality of internet protocol addresses to the client apparatus, and wherein determining comprises determining if the internet protocol address is associated with client apparatus on the client address list; and
    send, as a result of the determination, a message comprising the internet protocol address to the server apparatus via a wireless link to update the client address list.

15. The computer-program product of claim 14, wherein:
    the client apparatus has intermittent connectivity with a network such that the computer-readable medium further comprises code for causing the computer to repeatedly acquire new addresses assigned by the network; and
    the computer-readable medium further comprises code for causing the computer to repeatedly send messages to the server apparatus to update the client address list with the new addresses.

16. The computer-program product of claim 14, wherein the determination is made as a result of a reconnection of the client apparatus to a network.

17. The computer-program product of claim 14, wherein the client address list comprises a registration object hosted at the server apparatus.

18. A method of communication operable by a server apparatus, comprising:
    receiving a message from a client apparatus comprising an internet protocol address of the client apparatus; and
    updating a client address list maintained at the server apparatus to include the internet protocol address, wherein the client address list maintains an assignment of a plurality of internet protocol addresses to the client apparatus; and using the internet protocol address to communicate with the client apparatus.

19. The method of claim 18, further comprising:
receiving another message from another client apparatus comprising another address of the another client apparatus;
updating the client address list to include the another address; and
using the another address to communicate with the another client apparatus.

20. The method of claim 18, wherein the client address list maps an identifier of the client apparatus to at least one other address of the client apparatus.

21. The method of claim 18, wherein:
the client apparatus has intermittent connectivity with a network such that the client apparatus is repeatedly assigned new addresses by the network; and
the server apparatus repeatedly receives messages from the client apparatus to update the client address list with the new addresses.

22. The method of claim 18, wherein the client address list comprises a registration object hosted at the server apparatus.

23. The method of claim 18, wherein the client apparatus comprises a cell phone.

24. A server apparatus, comprising:
a message processor configured to receive a message from a client apparatus comprising an internet protocol address of the client apparatus; and
a list manager configured to update a client address list maintained at the server apparatus to include the internet protocol address, wherein the client address list maintains an assignment of a plurality of internet protocol addresses to the client apparatus; and
a communication controller configured to use the internet protocol address to communicate with the client apparatus.

25. The server apparatus of claim 24, wherein:
the message processor is further configured to receive another message from another client apparatus comprising another address of the another client apparatus;
the list manager is further configured to update the client address list to include the another address; and
the communication controller is further configured to use the another address to communicate with the another client apparatus.

26. The server apparatus of claim 24, wherein the client address list maps an identifier of the client apparatus to at least one other address of the client apparatus.

27. The server apparatus of claim 24, wherein:
the client apparatus has intermittent connectivity with a network such that the client apparatus is repeatedly assigned new addresses by the network; and
the message processor is further configured to repeatedly receive messages from the client apparatus to update the client address list with the new addresses.

28. The server apparatus of claim 24, wherein the client address list comprises a registration object hosted at the server apparatus.

29. A server apparatus, comprising:
means for receiving a message from a client apparatus comprising an internet protocol address of the client apparatus; and
means for updating a client address list maintained at the server apparatus to include the internet protocol address, wherein the client address list maintains an assignment of a plurality of internet protocol addresses to the client apparatus; and
means for using the internet protocol address to communicate with the client apparatus.

30. The server apparatus of claim 29, wherein:
the means for receiving is configured to receive another message from another client apparatus comprising another address of the another client apparatus;
the means for updating is configured to update the client address list to include the another address; and
the means for updating is configured to use the another address to communicate with the another client apparatus.

31. The server apparatus of claim 29, wherein the client address list maps an identifier of the client apparatus to at least one other address of the client apparatus.

32. The server apparatus of claim 29, wherein:
the client apparatus has intermittent connectivity with a network such that the client apparatus is repeatedly assigned new addresses by the network; and
the means for receiving is configured to repeatedly receive messages from the client apparatus to update the client address list with the new addresses.

33. The server apparatus of claim 29, wherein the client address list comprises a registration object hosted at the server apparatus.

34. A computer-program product, comprising:
non-transitory computer-readable medium comprising code for causing a computer to:
receive, at a server apparatus, a message from a client apparatus comprising an internet protocol address of the client apparatus; and
update a client address list maintained at the server apparatus to include the internet protocol address, wherein the client address list maintains an assignment of a plurality of internet protocol addresses to the client apparatus; and
use the internet protocol address to communicate with the client apparatus.

35. The computer-program product of claim 34, wherein the computer-readable medium further comprises code for causing the computer to:
receive another message from another client apparatus comprising another address of the another client apparatus;
update the client address list to include the another address; and
use the another address to communicate with the another client apparatus.

36. The computer-program product of claim 34, wherein the client address list maps an identifier of the client apparatus to at least one other address of the client apparatus.

37. The computer-program product of claim 34, wherein:
the client apparatus has intermittent connectivity with a network such that the client apparatus is repeatedly assigned new addresses by the network; and
the computer-readable medium further comprises code for causing the computer to repeatedly receive messages from the client apparatus to update the client address list with the new addresses.

38. The computer-program product of claim 34, wherein the client address list comprises a registration object hosted at the server apparatus.

* * * * *